United States Patent [19]

Jacks

[11] 4,215,876
[45] Aug. 5, 1980

[54] TRAILER HITCH

[76] Inventor: Donald E. Jacks, 2826 W. Cook Rd., Ft. Wayne, Ind. 46808

[21] Appl. No.: 946,418

[22] Filed: Sep. 27, 1978

[51] Int. Cl.² .............................................. B60D 7/00
[52] U.S. Cl. ................................. 280/483; 280/490 R
[58] Field of Search .................... 280/490 R, 483, 484

[56] References Cited

U.S. PATENT DOCUMENTS

| 1,327,265 | 1/1920 | Booth | 280/511 |
|---|---|---|---|
| 1,619,094 | 3/1927 | Thomas | 280/511 |
| 2,309,766 | 2/1943 | Harroun | 280/489 X |
| 3,414,295 | 12/1968 | Rendessy | 280/446 R |
| 3,708,183 | 1/1973 | Jones | 280/483 |
| 3,930,670 | 1/1976 | Haskins | 280/476 R |

Primary Examiner—John J. Love
Assistant Examiner—Randall A. Schrecengost

Attorney, Agent, or Firm—Gust, Irish, Jeffers & Hoffman

[57] ABSTRACT

A trailer hitch for attachment between a towing vehicle and a towed vehicle has a planar support member affixed to the towing vehicle and oriented substantially transversely to the towing direction. A planar slide is disposed between a pair of transversely spaced parallel vertical guides affixed to the support member and the slide is slidably retained by the guides. A tongue is affixed to, and extends from the slide in towed direction, and carries at its end a conventional hitching ball. A leaf spring is supported in vertically adjustable relation to the support member and in turn resiliently supports the tongue, and slide, at a given distance from the support member. The spring force is adjustable, as by removing or adding spring leaves.

6 Claims, 5 Drawing Figures

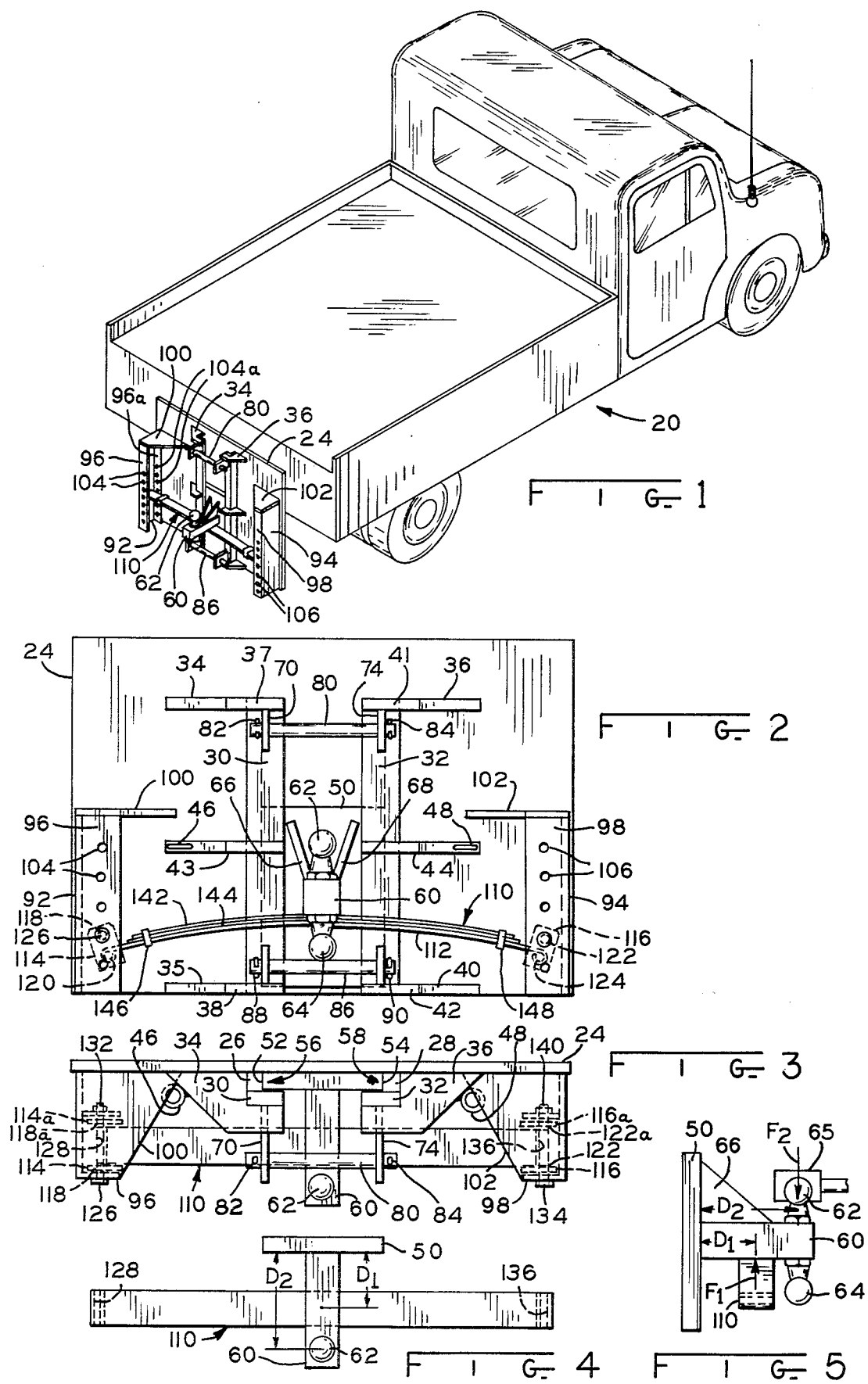

TRAILER HITCH

BACKGROUND OF THE INVENTION

1. Field of the Invention

This invention is in the field of trailer hitch attachments and more particularly to attachments in which the towing connection between the towing and towed vehicles is resiliently supported.

2. Description of the Prior Art

The travel-minded public has turned increasingly to the use of mobile homes which are towed in large part by tractor vehicles or pick-up trucks. Further, mobile homes are being used increasingly for semi-permanent living quarters, with home movement occurring infrequently but usually involving considerable distances. Also, these homes are of a size approaching normal living quarters and are of a cost approaching conventional housing of the same size. Therefore, it is important that the towing be accompanied by a minimum of stress to the home to prevent fatigue and failure of the frame and supporting members, as well as to minimize vibration and resultant breakage of the home contents. Efforts have been made in the past to cushion the towing connection to protect the mobile home and its contents. These efforts have included a resilient mounting to the trailer hitch on the towing vehicle and are exemplified by devices disclosed in the following U.S. Pat. Nos.: 1,327,265, 3,414,295, 1,619,094, and 3,708,183. However, the towing connection has been subject to force moments in a vertical plane in the towed direction so that excessive binding and frictional resistance between the resiliently supported members and their retaining members is present. This has resulted in shock and road vibration transfer from the towing vehicle to the towed vehicle.

SUMMARY OF THE INVENTION

A trailer hitch between a towing vehicle and towed vehicle has a metal support plate bolted or otherwise attached to the towing vehicle. A pair of transversely spaced parallel vertical guides are affixed, as by welding, to the plate and a slide, also of a plate configuration, is slidably retained in opposed grooves formed by the guides. A tongue is affixed as by welding centrally of the slide and extends in the towed direction. At the end of the tongue is a conventional trailer hitch ball for attachment with a conventional hitch socket which is affixed to the towed vehicle. A semi-elliptical leaf spring, has a base leaf and a plurality of superposed removable leaves. The base leaf is pivotally connected at each end to a shackle plate having an opening formed therein.

A pair of vertical transversely spaced angle irons are affixed to the support member and each has an elongated strip supported in spaced parallel relation to the support member, and each strip has a series of vertically spaced openings which are registrable with a respective shackle plate opening. A bolt is insertable through the openings for pivotably supporting each shackle plate to its respective strip. By selecting the proper strip openings, the spring may be vertically adjusted.

The center of the spring is engageable with the underside of the tongue at a predetermined distance from the support plate.

The number of leaves in spring may be adjusted to accommodate different vertical forces applied to the hitch ball on the tongue.

It is therefore an object of this invention to provide a trailer hitch between a towing and towed vehicle wherein the stressful towing forces to the towed vehicle are minimized.

Another object of this invention is to provide in the apparatus of the previous object an adjustable resilient force applied to the towing connection to accommodate towing loads of different vertical forces applied to the towing connection.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a perspective view of this invention attached to a towing vehicle;

FIG. 2 is a rear elevational view of the embodiment of FIG. 1;

FIG. 3 is a top plan view of the embodiment of FIG. 2;

FIG. 4 is a top plan partial view of the embodiment of FIG. 3; and

FIG. 5 is a side elevational view of the device in FIG. 4.

DESCRIPTION OF THE PREFERRED EMBODIMENT

Referring to the drawing, a towing vehicle 20, which may be a truck tractor or pick-up truck, or other vehicle ordinarily used for towing purposes, has attached, as by bolting or welding, to a rear chassis member 22 a support plate 24, which may be a three-quarter inch steel plate, and for a given application measures 34 inches wide and 30 inches high. Dimensions specified herein are for a particular application and are not limiting of this invention. Welded to plate 24 are a pair of elongated metal spacer strips 26, 28, each of which is one inch by 1 1/16 inches in cross section. Welded to the outer edges of spacer strips 26, 28 are elongated metal strips 30, 32, respectively, each of which is one inch by 2½ inches in cross section. Strips 26 and 30 are supportedly attached to plate 24 at their upper and lower ends by gusset brackets 34, 35, respectively, having transversely extending supporting lips 37, 38, respectively, which are welded to strip 30. Strips 28 and 32 are supportedly attached to plate 24 at their upper and lower ends by gusset brackets 39, 40, respectively, having transversely extending supporting lips 41, 42 respectively which are welded to strip 32. Welded intermediately of strips 30, 32 are gusset brackets 43, 44 respectively, similar in configuration to brackets 34, 36, but having hasps 46, 48, welded thereto to provide connection points for a conventional safety chain, not shown, for attachment to the towed vehicle to insure that in the event of failure of the towing connection, the towed vehicle will not become disconnected from the towing vehicle.

A slide 50, which, in this embodiment, is a one inch steel plate 8 inches wide and 12 inches high, is slidably retained at its edges 52, 54 in grooves 56, 58, respectively formed between strip 30 and plate 24 and strip 32 and plate 24 respectively. Slide 50 has welded thereto and extending therefrom in the towed direction a tongue 60, which in this embodiment is a solid steel bar 2½ inches×2½ inches×8 inches long with hitching balls 62, 64 extending from the upper and lower surfaces thereof, respectively. In this embodiment, balls 62, 64 are 2 5/16 inches in diameter and are adapted to be releasably retained in sockets 65 attached to the towed vehicle and are of conventional design in the trailer industry. Tongue 60 is supported by two support brackets 66, 68 welded to the upper surface of tongue 60 and the surface of slide 50.

Welded to strip 30 is upper pin bracket 70 and lower pin bracket 72 and welded to strip 32 is upper pin bracket 74 and lower pin bracket 76. Brackets 70 and 74 have openings for receiving and supporting safety stop pin 80 which is insertable therethrough and held in position by cotter pins 82, 84 and brackets 72 and 76 have openings therein for receiving and supporting safety stop pin 86 held in place by cotter pins 88, 90. The purpose of pins 80 and 86 is to bear against tongue 60 to prevent escape from grooves 56, 58 in the upward, and downward directions respectively, in normal use. As seen in FIG. 2, when moved to its uppermost position into engagement with pin 80, tongue 60 spaces from spring 110, later described.

Affixed, as by welding, to the outer edges of plate 24 are upright elongated angle brackets 92, 94. Bracket 92 has elongated strip 96 formed transversely at the edge thereof and elongated strip 96a, spaced from and parallel to strip 96, welded thereto. Bracket 94 has elongated strip 98 formed transversely at the edge thereof and elongated strip 98a welded thereto in parallel with and spaced relation to strip 98. Gusset plates 100, 102 are affixed as by welding to plates 92 and 94 respectively and to plate 24. Strips 96, 96a have a plurality of spaced vertically aligned holes 104, 104a, respectively, formed therein and legs 98, 98a have a plurality of spaced vertically aligned holes 106, 106a, respectively, formed therein. Corresponding holes 104, 104a are horizontally aligned with corresponding counterpart holes 106, 106a.

A semi-elliptical leaf spring 110 has a base leaf 112 with shackle openings 128 and 136 at opposite ends thereof. Spaced shackle plates 114, 114a, carry pin 120 and spaced shackle plates 116, 116a carry pin 122. Pins 120, 122 are inserted in pivotable relation in openings 128, 136, respectively, at opposite ends of spring leaf 112. Plates 114, 114a also have openings 118, 118a, respectively, formed in the upper portions thereof. Plates 116, 116a have openings 122, 122a formed therein. Bolt or pin 126 is inserted through a hole 104, and shackle plate openings 118, 118a, in pivotable relation thereto, and through a horizontally aligned hole 104a in strip 96a and then secured with nut 132 so that plates 114, 114a are pivotally attached between and in pivotable relation to strip 96 and 96a. In a similar manner, a bolt or pin 134 is inserted through a hole 106, in horizontal alignment with a corresponding hole 104, shackle plate openings 118, 118a, and a hole 106a in strip 98a and is secured at its end by a nut 140 so that the other end of leaf 112 is pivotally attached between strips 98 and 98a. It is to be understood that the vertical position of spring 110 may be adjusted by removing bolts 126, 134, vertically moving leaf 112 until the opening in shackle plates at one end of leaf 112 become aligned with desired openings 104, 104a, reinserting and securing bolt 126 and in similar manner moving the other end of leaf 112 until the openings in shackle plates at that end are aligned with openings 106, 106a horizontally corresponding to the openings 104, 104a selected in strips 96, 96a, respectively, and reinserting and securing bolt 134.

Spring 110 has two additional removable semielliptical leafs 142, 144 which may be added or removed from base leaf 112 by removing spring bolts 146, 148 making the desired adjustment and selection of the desired number of leaves, and then reinserting and attaching bolts 146 and 148. In this manner adjustable spring force is available.

The center of spring 110 bears against the underside of tongue 60 (FIG. 4) a distance of D 1 from plate 50. Spring 110 exerts a vertically upward spring force F 1 on tongue 60. Socket 65 is removably engaged with ball 62, in a manner well known to the art, and is attached to the towed vehicle. Socket 65 exerts a force F 2 on tongue 60 at a distance D 2 from plate 50. Spring force F 1 and distance D 1 are selected so that shock and/or vibratory force transmission between the towing and the towed vehicle will be minimized. Thus, vertical slide forces between slide 50 and grooves 56 and 58 are provided. Binding between the edges of slide 50 and grooves 56, 58 is minimized thereby reducing stresses placed on the frame and structural members of the towed vehicle as well as reducing vibration of the vehicle contents. Lubrication between the edges of slide 50 and grooves 56, 58 will aid in the sliding movement therebetween and further reduce the undesired force transmission.

As mentioned, the spring force of spring 110 is adjustable and therefore with smaller vertical force F 2, exerted by socket 65 on ball 62, a smaller spring force F 1 may be selected. While tongue 60 rests on spring 110 as shown in the drawings, it may be freely moved and spaced upwardly therefrom by raising the tongue 60 until it engages the safety pin 80, the sliding movement of plate 50 in its guides 30 and 32 accommodating this upward movement.

While there have been described above the principles of this invention in connection with specific apparatus, it is to be clearly understood that this description and the recited dimensions are made only by way of example and not as a limitation to the scope of the invention.

What is claimed is:

1. Vehicle hitch apparatus for connecting a towed vehicle to a towing vehicle comprising an upright flat support member adapted to be affixed to the rear of the towing vehicle, a pair of horizontally spaced vertical guides secured to said member, a slide plate vertically slidably received by said guides, an elongated tongue secured at one end to said slide plate and extending horizontally rearwardly therefrom, a towed vehicle attachment member secured to said tongue distally from said plate, spring means operatively carried by said support member for resiliently supporting said tongue for movement vertically, said spring means including a leaf spring having a base leaf and a plurality of removable superposed leaves, a pair of vertical horizontally spaced elongated angle brackets affixed to said support member, said brackets projecting rearwardly from said support member and having a plurality of vertically spaced openings with a pair of mounting pins selectively received thereby for vertical adjustment, respectively, a pair of shackle plates provided with mounting openings and which are pivotally connected to said brackets by means of said pins, respectively, and said base leaf being pivotally connected at its opposite ends to said shackle plates, respectively.

2. Vehicle hitch apparatus for connecting a towed vehicle to a towing vehicle comprising a support member adapted to be affixed to the rear of the towing vehicle, a pair of horizontally spaced vertical guides secured to said member, a slide plate vertically slidably received by said guides, an elongated tongue secured at one end to said plate and extending horizontally rearwardly therefrom, a towed vehicle attachment member secured to said tongue distally from said plate, spring means operatively carried by said support member for resiliently supporting said tongue for movement vertically, said spring means including a leaf spring having one or more leaves operatively connected at its opposite ends to said support member, said tongue having resting engagement on top of said spring, said slide plate being freely upwardly moveable in said guides thereby to disengage and space said tongue from said spring and to permit said tongue's movement thereabove free from interference with said spring.

3. The apparatus of claim 2 including a stop member operatively associated with said guides for engagement by said slide plate to limit the extent of the upward movement of the latter.

4. The apparatus of claim 2 wherein said leaf spring engages the underside of said tongue at a location between said attachment member and said plate at a location at which the transmission of shock and vibration between towed and towing vehicles are minimized by reason of the sliding movement of said plate in said guides.

5. The apparatus of claim 2 including means for vertically adjusting said spring means relative to said support member.

6. The apparatus of claim 2 wherein said spring means has an adjustable spring force.

* * * * *